(12) United States Patent
Amoah et al.

(10) Patent No.: US 9,709,748 B2
(45) Date of Patent: Jul. 18, 2017

(54) FRONTSIDE COUPLED WAVEGUIDE WITH BACKSIDE OPTICAL CONNECTION USING A CURVED SPACER

(71) Applicant: INTERNATIONAL BUSINESS MACHINES CORPORATION, Armonk, NY (US)

(72) Inventors: Yoba Amoah, Fairfax, VT (US); Brennan J. Brown, Burlington, VT (US); John J. Ellis-Monaghan, Grand Isle, VT (US); Ashleigh R. Kreider, Richmond, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/844,327

(22) Filed: Sep. 3, 2015

(65) Prior Publication Data
US 2017/0068052 A1   Mar. 9, 2017

(51) Int. Cl.
*G02B 6/30* (2006.01)
*G02B 6/32* (2006.01)
*G02B 6/26* (2006.01)
*G02B 6/125* (2006.01)

(52) U.S. Cl.
CPC ............... *G02B 6/30* (2013.01); *G02B 6/125* (2013.01); *G02B 6/262* (2013.01); *G02B 6/32* (2013.01)

(58) Field of Classification Search
CPC . G02B 6/30; G02B 6/32; G02B 6/262; G02B 6/26; G02B 6/125
See application file for complete search history.

(56) References Cited

U.S. PATENT DOCUMENTS

| | | | |
|---|---|---|---|
| 4,472,020 A * | 9/1984 | Evanchuk | B05D 3/06 385/14 |
| 6,236,786 B1 | 5/2001 | Aoki et al. | |
| 6,587,421 B1 * | 7/2003 | Wilde | G02B 6/2551 369/107 |
| 6,798,589 B2 * | 9/2004 | Uekawa | G02B 3/00 359/819 |
| 7,162,124 B1 | 1/2007 | Gunn, III et al. | |
| 7,263,248 B2 * | 8/2007 | Windover | H05K 1/0274 385/14 |
| 7,303,339 B2 | 12/2007 | Zhou et al. | |
| 7,466,880 B2 * | 12/2008 | Windover | H05K 1/0274 385/129 |

(Continued)

FOREIGN PATENT DOCUMENTS

| | | |
|---|---|---|
| JP | 2600832 | 4/1997 |
| JP | 11248956 | 9/1999 |
| JP | 3131044 | 1/2001 |

*Primary Examiner* — Andrew Jordan
(74) *Attorney, Agent, or Firm* — Steven Meyers; Andrew M. Calderon; Roberts Mlotkowski Safran Cole & Calderon, P.C.

(57) ABSTRACT

A method of manufacturing a device includes forming an optical coupler having a first end contacting a front side of a semiconductor substrate and a second end contacting an optical waveguide on an insulator layer on the substrate. The optical coupler is curved between the first end and the second end. The optical coupler is configured to change a direction of travel of light from a first direction at the first end to a second direction at the second end.

18 Claims, 10 Drawing Sheets

(56) References Cited

U.S. PATENT DOCUMENTS

| | | | |
|---|---|---|---|
| 7,995,881 B2* | 8/2011 | Hodono | G02B 6/4214 385/14 |
| 8,064,745 B2 | 11/2011 | Fortusini et al. | |
| 8,399,292 B2 | 3/2013 | Doany et al. | |
| 8,599,301 B2* | 12/2013 | Dowski, Jr. | B24B 13/06 250/216 |
| 8,620,122 B2* | 12/2013 | Meadowcroft | G02B 6/4286 385/14 |
| 8,692,276 B2* | 4/2014 | Doany | G02B 6/4246 257/79 |
| 8,735,797 B2 | 5/2014 | Yu et al. | |
| 8,754,359 B2 | 6/2014 | Yu et al. | |
| 8,818,145 B2* | 8/2014 | Bowen | G02B 6/4214 29/825 |
| 2003/0156327 A1* | 8/2003 | Terakawa | G02B 6/4206 359/592 |
| 2004/0109641 A1* | 6/2004 | Uekawa | G02B 3/00 385/33 |
| 2004/0240085 A1* | 12/2004 | Uekawa | G02B 3/00 359/811 |
| 2011/0142395 A1* | 6/2011 | Fortusini | G02B 6/34 385/37 |
| 2011/0278441 A1 | 11/2011 | Vermeulen et al. | |
| 2012/0308177 A1 | 12/2012 | Joblot et al. | |
| 2013/0034325 A1* | 2/2013 | Bowen | G02B 6/4214 385/14 |
| 2014/0252314 A1 | 9/2014 | Yu et al. | |

\* cited by examiner

FRONTSIDE COUPLED WAVEGUIDE WITH BACKSIDE OPTICAL CONNECTION USING A CURVED SPACER

BACKGROUND

The invention relates to semiconductor structures and, more particularly, to structures for coupling an optical fiber to an optical waveguide and methods of manufacture.

The use of both photonic devices in high-speed switching and transceiver devices in data communications are but a few examples that highlight the advantages of processing both optical and electrical signals within a single integrated device. For example, an integrated photonic device may include both photonic and complementary metal-oxide-semiconductor (CMOS) type devices that may be fabricated with a single substrate. However, optical signals may need to be efficiently transmitted to and from the integrated photonic device without enduring significant power loss. Moreover, within the integrated photonic device, optical signals may need to be efficiently coupled to a photonic device (e.g., a photodetector) via an optical waveguide residing within the integrated photonic device.

Transmitting light from a light source, such as a laser, across a semiconductor structure, such as an integrated circuit, can be difficult to achieve. For example, sophisticated alignment packaging schemes are needed to align the integrated circuit to an optical fiber. This alignment needs to be accurate to the submicron level, which can be very costly. Also, the diameter of fiber, and a beam of light output by the fiber, can be substantially larger, e.g., by a factor of 200, than the diameter of a waveguide. Because of this large difference in diameter, substantial optical loss often occurs when coupling the fiber to the waveguide.

SUMMARY

In an aspect of the invention, a method of manufacturing a device includes forming an optical coupler having a first end contacting a front side of a semiconductor substrate and a second end contacting an optical waveguide on an insulator layer on the substrate. The optical coupler is curved between the first end and the second end. The optical coupler is configured to change a direction of travel of light from a first direction at the first end to a second direction at the second end.

In an aspect of the invention, a method of manufacturing a device includes: removing a portion of a semiconductor layer and a portion of a buried insulator layer from a front side of a substrate; forming a curved spacer on the front side of a substrate and contacting a sidewall of the semiconductor layer and a sidewall of the buried insulator layer; and forming a silicon structure on the substrate, the curved spacer, and the semiconductor layer. The silicon structure includes: a first end contacting the front side of the substrate, a second end contacting the semiconductor layer, and a curved upper surface between the first end and the second end. The method also includes forming a cladding layer on the curved upper surface of the silicon structure.

In an aspect of the invention, an integrated device includes: a silicon-material substrate; an optical waveguide over a front side of the substrate; and an optical coupler comprising a first end contacting the front side of the substrate and a second end contacting the optical waveguide. The optical coupler is curved between the first end and the second end. The optical coupler is configured to change a direction of travel of light from a first direction at the first end to a second direction at the second end.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
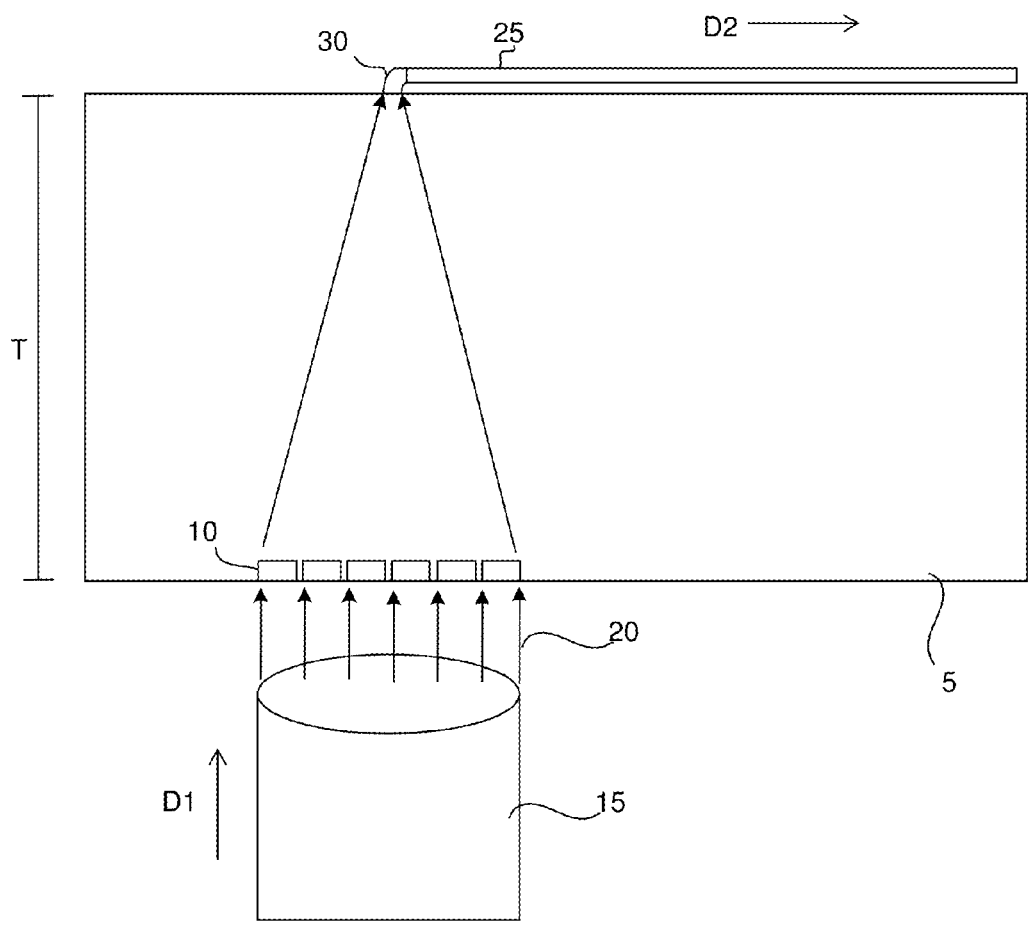
FIG. 1 shows an overview of an exemplary wafer with a frontside coupled waveguide and backside optical connection in accordance with aspects of the present invention.

The invention relates to semiconductor structures and, more particularly, to structures for coupling an optical fiber to an optical waveguide and methods of manufacture. Aspects of the invention are directed to a coupling structure that optically couples a relatively large optical fiber at one side of a substrate or wafer to a relatively small optical waveguide at another side of the substrate. In embodiments, the coupling structure provides a vertical-to-horizontal optical coupling of the optical fiber and the optical waveguide. The coupling structure is a vertical-to-horizontal optical coupling because light travels primarily in a vertical direction in the fiber and primarily in a horizontal direction in the waveguide, and the coupling structure facilitates the change in direction from the fiber to the waveguide. In this manner, the coupling structure bends incoming light from the backside of the wafer to couple with the waveguide at the front side of the wafer.

In embodiments, the coupling structure includes a spacer, a polysilicon rounded corner, and a lateral coupling region at a front side of the wafer. Structures described herein may optionally include a lens at the backside of the wafer. Structures described herein may optionally include an anti-reflective coating at the backside of the wafer.

The structures in accordance with aspects of the present invention can be fabricated using conventional fabrication processes. For example, the structures of the present invention can be manufactured in a number of ways using a number of different tools. In general, though, the methodologies and tools are used to form structures with dimensions in the micrometer and nanometer scale. The methodologies, i.e., technologies, employed to manufacture the structures of the present invention have been adopted from integrated circuit (IC) and printed circuit board technology. For example, the structures of the present invention are realized in films of material patterned by photolithographic processes. In particular, the fabrication of the structures of the present invention uses three basic building blocks: (i) deposition of thin films of material on a substrate, (ii) applying a patterned mask on top of the films by photolithographic imaging, and (iii) etching the films selectively to the mask.

For example, a method of forming a right angle optical coupler in accordance with aspects of the invention may include: providing a silicon on insulator substrate having a top silicon layer and a buried oxide (BOX) underlying the top silicon layer; etching a first region of the top silicon layer and the box layer; depositing a first oxide over the etched first region and overlapping a non-etched region of the top silicon layer and the box layer; etching the first oxide to form a spacer structure between the non-etched region and the first region; depositing a first polysilicon layer over the first region, non-etched region and the spacer to form a right angle waveguide; etching part of the first polysilicon layer at a first end and a second end; depositing a second oxide over the etched first polysilicon layer.

FIG. 1 shows a semiconductor structure with an optical coupling structure in accordance with aspects of the present invention. As shown in FIG. 1, the semiconductor structure may include a wafer 5 with a waveguide 25 provided on a topside of the wafer 5. A coupling structure (e.g., a coupler) 30 may connect the waveguide 25 to the wafer 5. The wafer 5 includes a lens 10 integrated on an opposite side of the wafer 5, e.g., a bottom side of the wafer 5 with respect to the waveguide 25 and the coupler 30.

In embodiments, the lens 10 may be a binary diffractive grating lens. In operation, the lens 10 receives light 20 from an optical fiber 15, e.g., from a bottom side of the wafer 5, and focuses the light 20 to the waveguide 25, e.g., via the coupler 30. For example, when the light 20 contacts the lens 10, the direction of the light 20 changes towards the coupler 30. In this way, the lens 10 reduces a width of the light 20 to converge to a smaller width. For example, the lens 10 may focus the light 20 to approximately the width of the coupler 30. In embodiments, the lens 10 will focus the light 20 by a factor of approximately 200. For example, the lens 10 may focus the light 20 from approximately 100 micrometers off center to approximately 0.5 micrometers. As shown in FIG. 1, wafer 5 has a thickness T that is relatively large, thus reducing the angle at which the light 20 changes direction, and hence, minimizing optical loss.

Still referring to FIG. 1, the optical fiber 15 is configured such that light travels primarily in a first direction D1, and the waveguide 25 is configured such that light travels primarily in a second direction D2. In embodiments, the first direction D1 is substantially perpendicular to the second direction D2. For example, the first direction D1 may be generally vertical relative to the surfaces defining the front and back sides of the wafer 5, and the second direction D2 may be generally horizontal relative to the same surfaces. In this manner, the coupler 30 alters the primary direction of travel of the light by about 90° between the fiber 15 and the waveguide 25.

Figure 2:
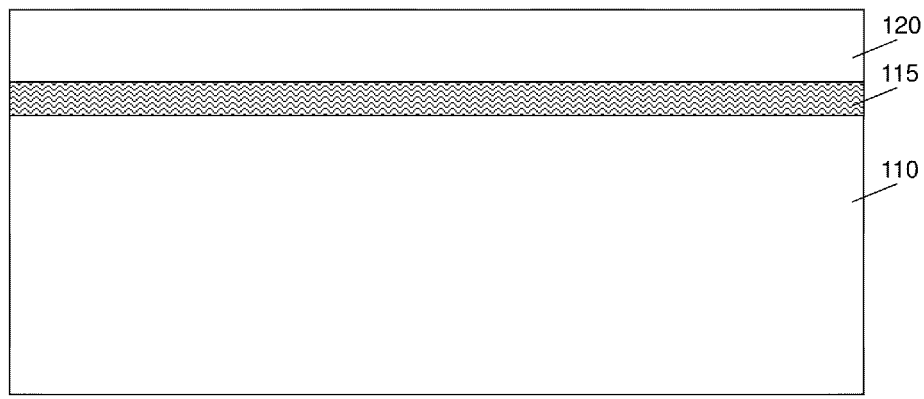
FIGS. 2-8 show processing steps and respective structures in accordance with aspects of the invention.

FIGS. 2-10 show processing steps and respective structures in accordance with aspects of the invention. The steps shown and described with respect to FIGS. 2-10 may be used to manufacture the device shown in FIG. 1. FIG. 2 shows a starting structure for making an optical coupler. In particular, FIG. 2 shows a silicon-on-insulator (SOI) wafer comprising a substrate 110, an insulator layer 115 on the substrate 110, and a semiconductor layer 120 on the insulator layer 115. The constituent materials of the layers may be selected based on the desired end use application of the device. For example, the substrate 110 may be composed of any suitable material including conductor materials, semiconductor material, and dielectric materials. More specifically, the substrate 110 may be composed of Si, SiGe, SiGeC, SiC, GE alloys, GaAs, InAs, InP, and other III/V or II/VI compound semiconductors.

The insulator layer 115 may be composed of a dielectric material such as, for example, $SiO_2$ or other oxides. In embodiments, the insulator layer 115 is composed of a material that has a refractive index that is less than the refractive index of the material of the semiconductor layer 120.

The semiconductor layer 120 may comprise silicon, such as single crystal silicon, polysilicon, GaAs, SiC, or other semiconductor materials in which devices can be designed. In embodiments, the semiconductor layer 120 is composed of a material that has a refractive index that is greater than the refractive index of the material of the insulator layer 115, and that is also greater than the refractive index of any cladding material later-formed on the surfaces of waveguide cores formed from the semiconductor layer 120.

The substrate 110, insulator layer 115 and semiconductor layer 120 may have any desired thickness in the vertical direction, e.g., in the direction perpendicular to the interface between the insulator layer 115 and the semiconductor layer 120. In a non-limiting example, the substrate 110 has a thickness of about 100 μm to about 800 μm, the insulator layer 115 has a thickness of about 1.0 μm to about 15 μm, and the semiconductor layer 120 has a thickness of about 0.1 μm to about 0.3 μm; although other dimensions are contemplated by aspects of the invention.

Figure 3:
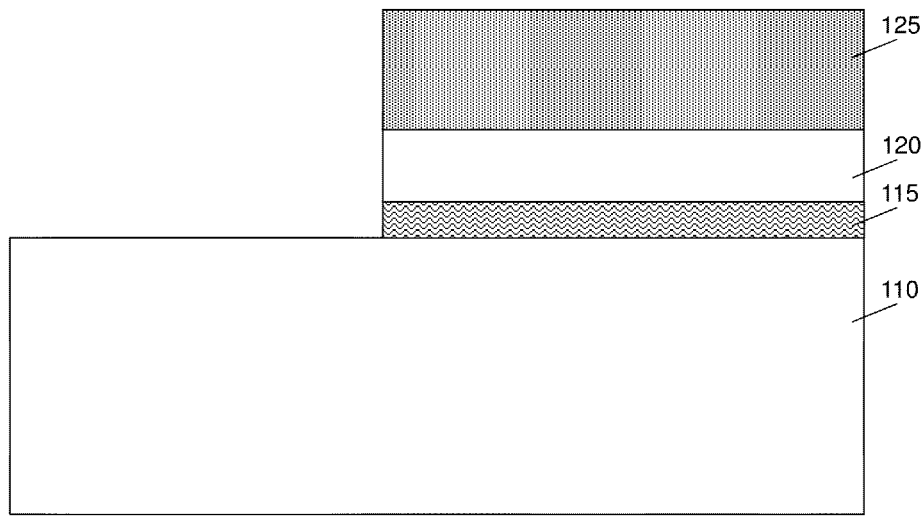

As shown in FIG. 3, a portion of the insulator layer 115 and semiconductor layer 120 are removed to expose a top surface of the substrate 110. The portion of the insulator layer 115 and semiconductor layer 120 may be removed using masking and etching. The masking may be performed using conventional photolithography techniques, such as forming a photomask 125 by forming a layer of photoresist material on the semiconductor layer 120, exposing the photoresist material to a pattern of light, and developing the exposed photoresist material. The etching may comprise conventional etching techniques, such as a reactive ion etch (RIE) that is used to remove portions of the semiconductor layer 120 and insulator layer 115 that are not covered by the photomask 125. After etching, the photomask 125 may be removed using a conventional ashing or stripping process.

Figure 4:
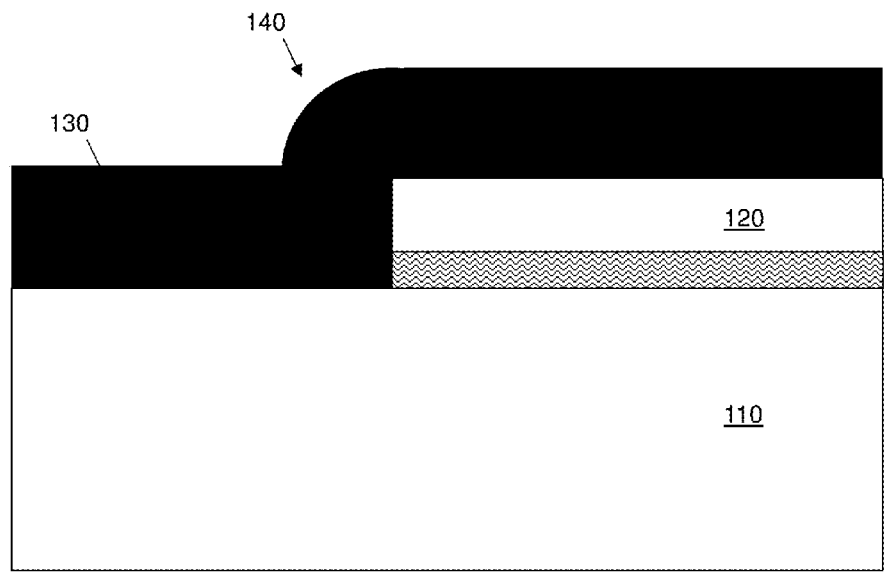

As shown in FIG. 4, an oxide 130 is formed on portions of the substrate 110 and the semiconductor layer 120. In embodiments, the oxide is formed using chemical vapor deposition (CVD) or other suitable conformal deposition process. The layer of oxide 130 has a rounded portion 140 due to the conformal deposition on the step-like transition between the substrate 110 and the semiconductor layer 120. In embodiments, the thickness of the oxide 130 is about 1 to 4 μm, although other thicknesses may be used.

Figure 5:
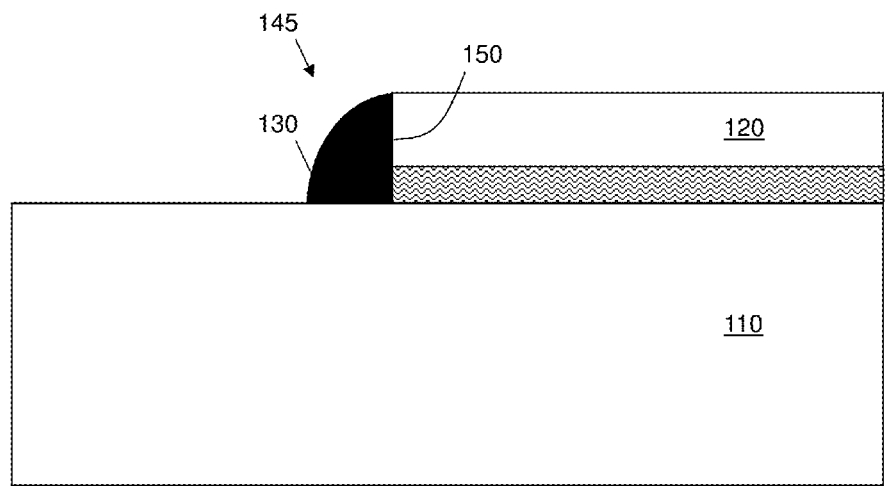

As shown in FIG. 5, portions of the oxide 130 are removed from the substrate 110 and the semiconductor layer 120 to form a curved spacer 145 at the step-like transition surface 150. In embodiments, oxide 130 is removed from using a sidewall spacer etch process, such as a timed or endpoint anisotropic etching process. In embodiments, the thickness of the layer of oxide 130 (shown in FIG. 4) is selected such that the spacer 145 has a radius of curvature of about 3 to 5 μm, although other radii may be used.

Figure 6:
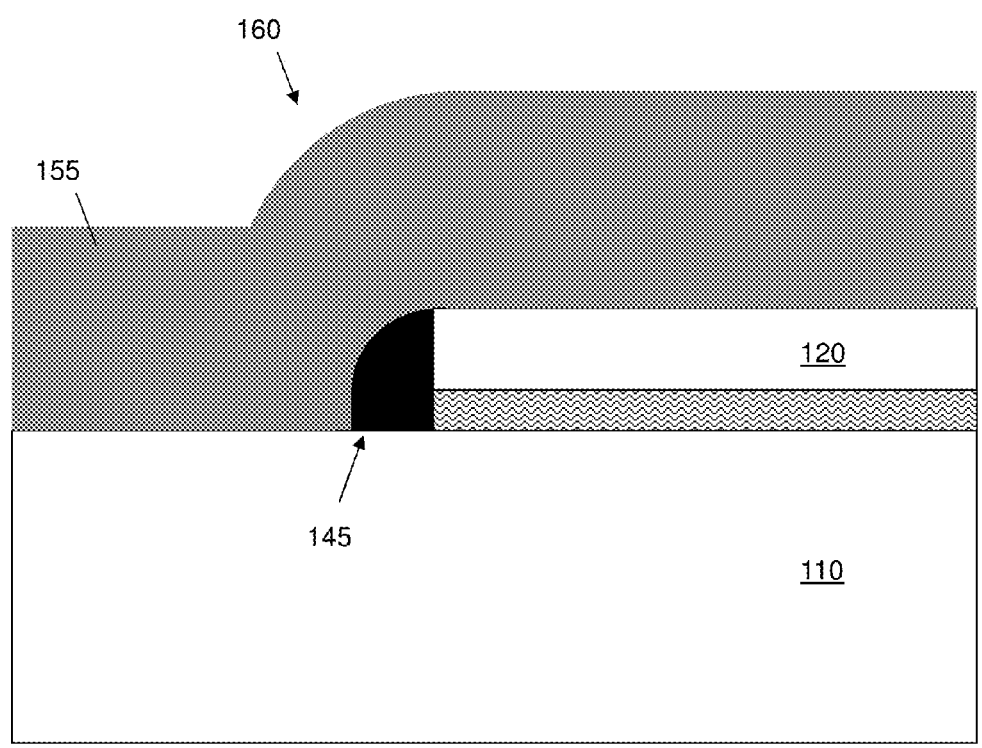

As shown in FIG. 6, a silicon layer 155 is formed on the exposed surfaces of the substrate 110, the semiconductor layer 120, and the spacer 145. The silicon layer 155 may comprise polysilicon or amorphous silicon, and may be formed using conventional semiconductor manufacturing processes such as Low-Pressure CVD (LPCVD) and Plasma-Enhanced CVD (PECVD). In embodiments, the silicon layer 155 comprises polysilicon formed using LPCVD. The silicon layer 155 may have a thickness of about 3 μm, although other thicknesses may be used. As illustrated in FIG. 6 and according to aspects of the invention, the silicon layer 155 is formed on and directly contacting an upper surface of the substrate 110 and an upper surface of the semiconductor layer 120. Moreover, the silicon layer 155 has a rounded portion 160 between the locations where it contacts the upper surface of the substrate 110 and the upper surface of the semiconductor layer 120.

Figure 7:
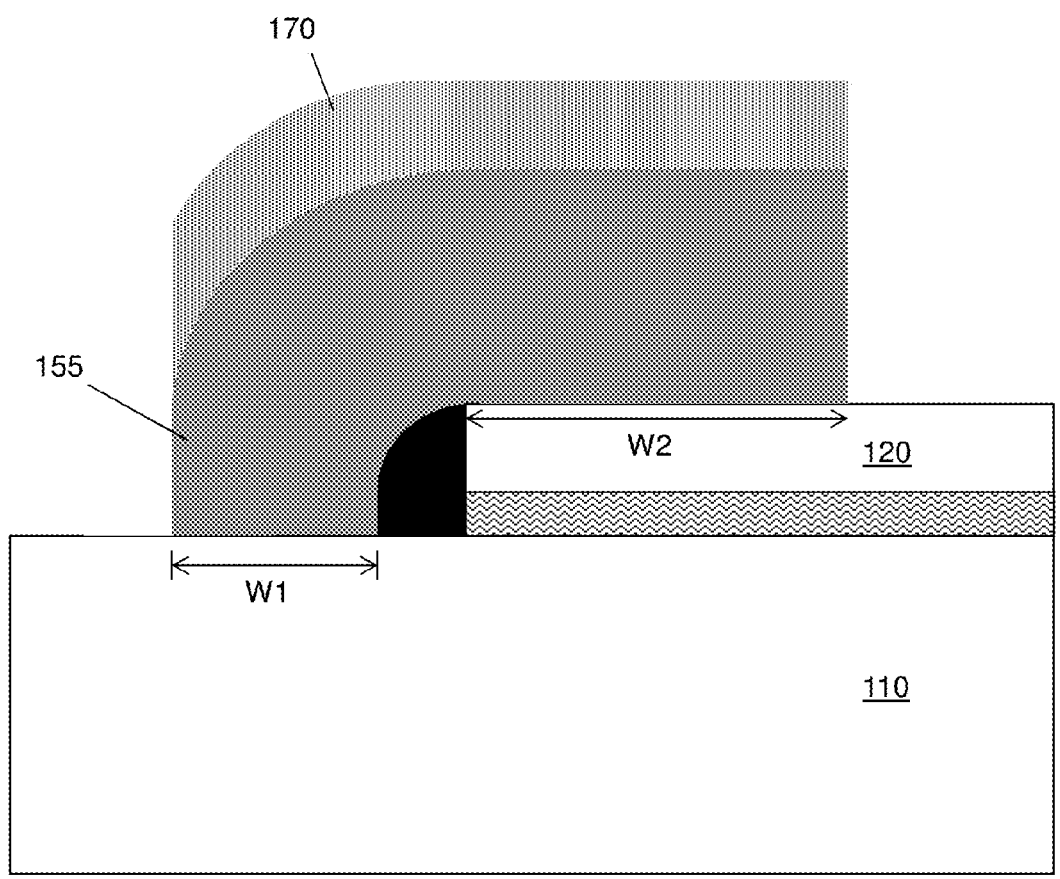

As shown in FIG. 7, portions of the silicon layer 155 are removed, and the remaining portion of the silicon layer 155 forms the coupling structure. The portions of the silicon layer 155 may be removed using a photomask 170 and etching, e.g., using techniques already described herein. The masking and etching are performed such that a first dimension W1 of the silicon layer 155 remains on the substrate 110 and a second dimension W2 of the silicon layer 155 remains on the semiconductor layer 120.

Figure 8:
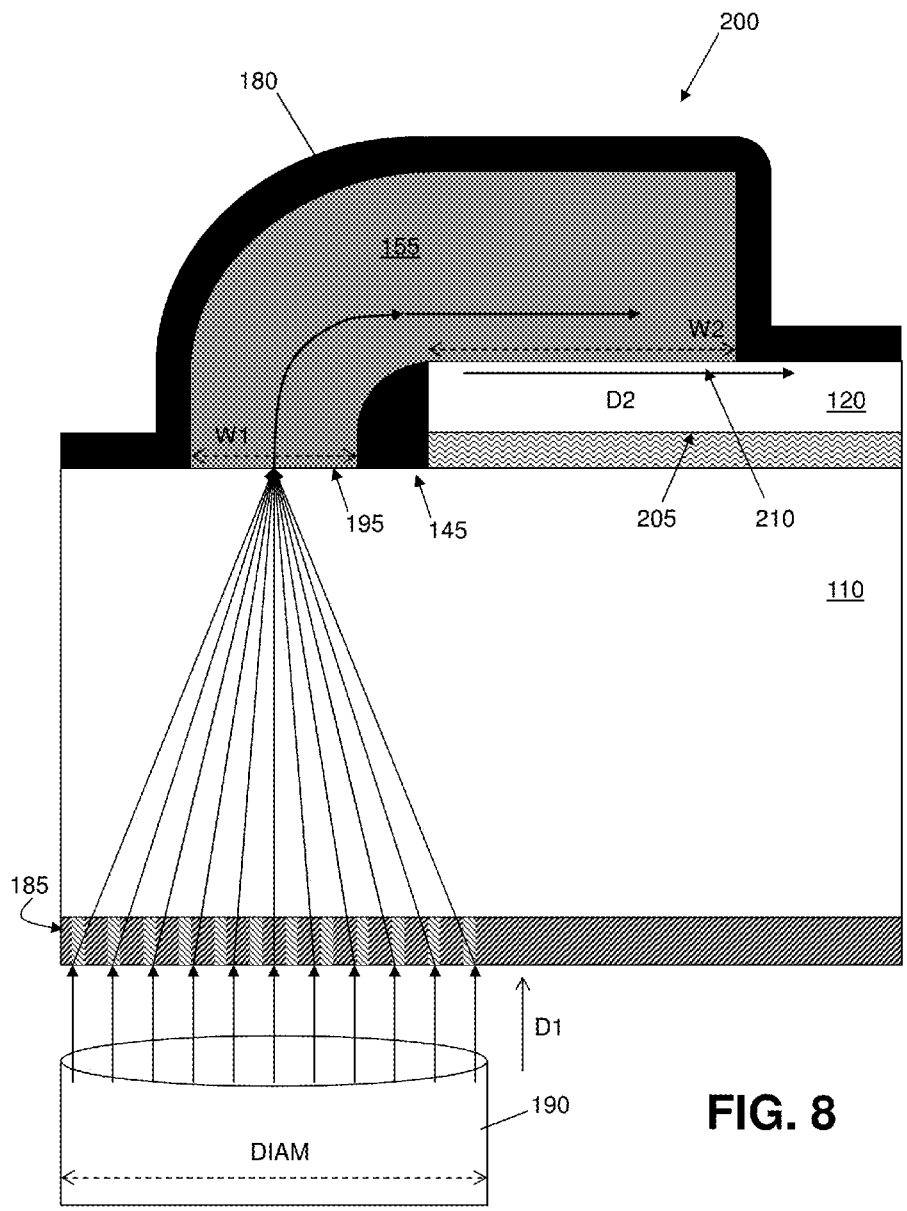

As shown in FIG. 8, an oxide layer 180 is formed on the exposed surfaces of the substrate 110, silicon layer 155, and semiconductor layer 120. The oxide layer 180 may comprise oxide formed using CVD to a nominal depth of about 0.8 to 1.5 μm, although other thicknesses can be used. The material of the oxide layer 180 and the material of the spacer 145 each has a different refractive index than the material of the silicon layer 155, such that oxide layer 180 and the spacer 145 function as curved cladding layers on curved surfaces of the silicon layer 155.

FIG. 8 also shows a lens 185 formed on the backside of the substrate 110, and an optical fiber 190 aligned with the lens. In embodiments, the lens 185 is a diffraction grating lens that receives light from the fiber 190 and focuses the light toward a first end 195 of the coupler 200 (the light being represented by arrows in FIG. 8). The lens 185 and fiber 190 may be formed in a conventional manner. The fiber 190 may be coupled to the backside of the substrate 110 in a conventional manner.

In embodiments, the first dimension W1 of the first end 195 of the coupler 200 is selected to provide an adequately sized target for the lens 185. In an exemplary, non-limiting implementation, the diameter DIAM of the fiber 190 is about 100 μm, the thickness T of the substrate 110 is about 725 μm, and the first dimension W1 is about 2 to 3 μm. In this manner, light in the fiber 190 travels into the lens 185, is focused by the lens 185 through the substrate 110 and into the first end 195 of the coupler 200.

Still referring to FIG. 8, the remaining portion of the semiconductor layer 120 constitutes a waveguide 205 that is configured to transmit light primarily the second direction D2. In embodiments, the coupler 200 changes the direction of travel of the light, from the first direction D1 associated with the fiber 190 to the second direction D2 associated with the waveguide 205. The change of direction is accomplished by the curvature of the coupler 200 and the cladding formed by the oxide layer 180 and spacer 145. In embodiments, light is conveyed from the coupler 200 to the waveguide 205 using an adiabatic coupler, and the second dimension W2 of the second end 210 of the coupler 200 is selected to provide an adequately sized and shaped profile for the adiabatic coupler.

Figure 9A:
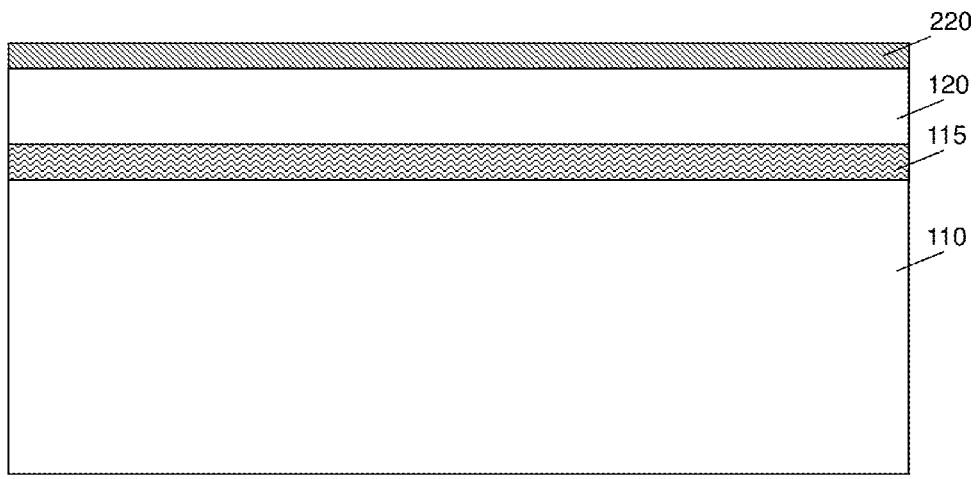
FIGS. 9a-e and 10 show processing steps and respective structures in accordance with aspects of the invention.
Figure 9B:
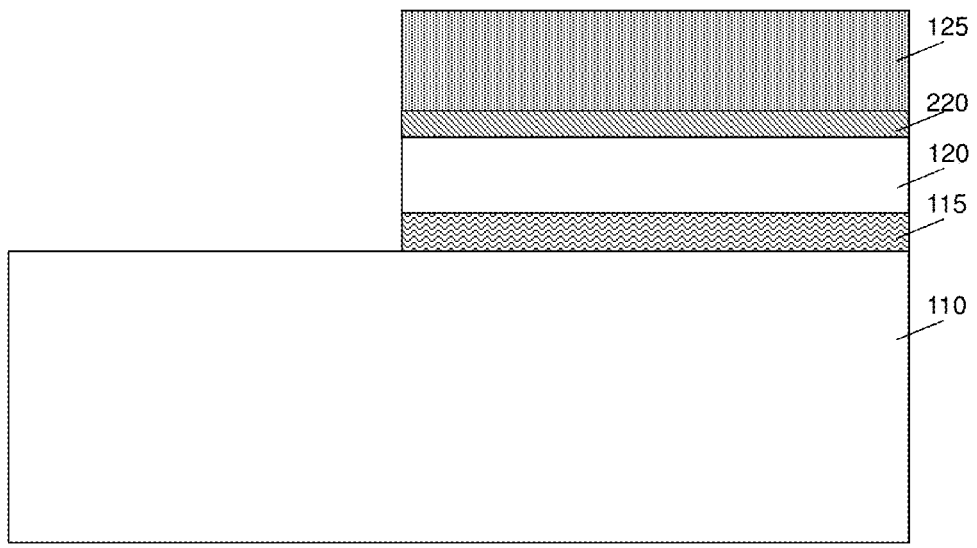
Figure 9C:
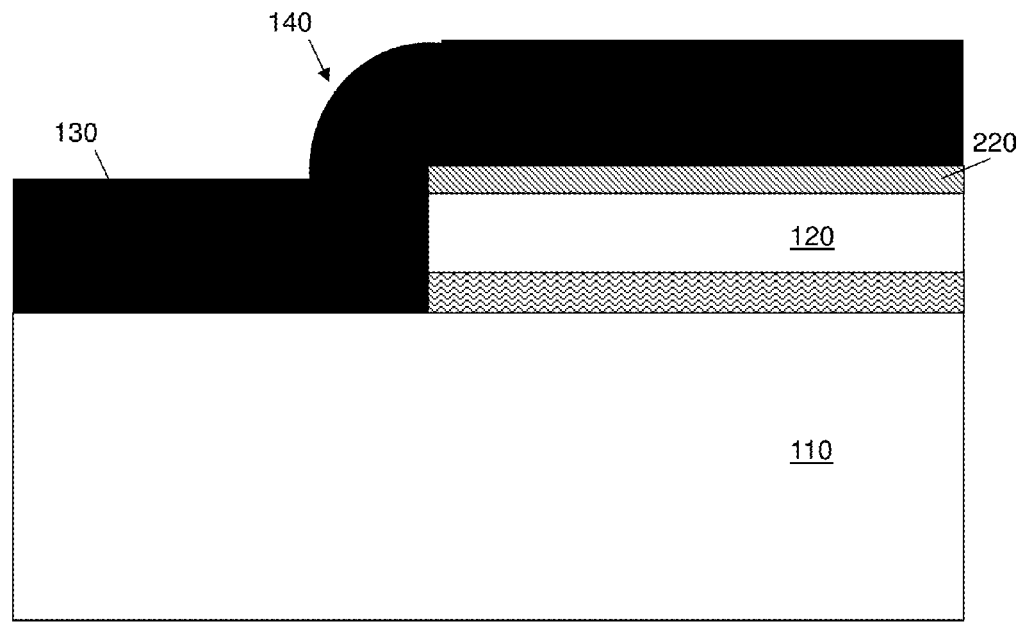
Figure 9D:
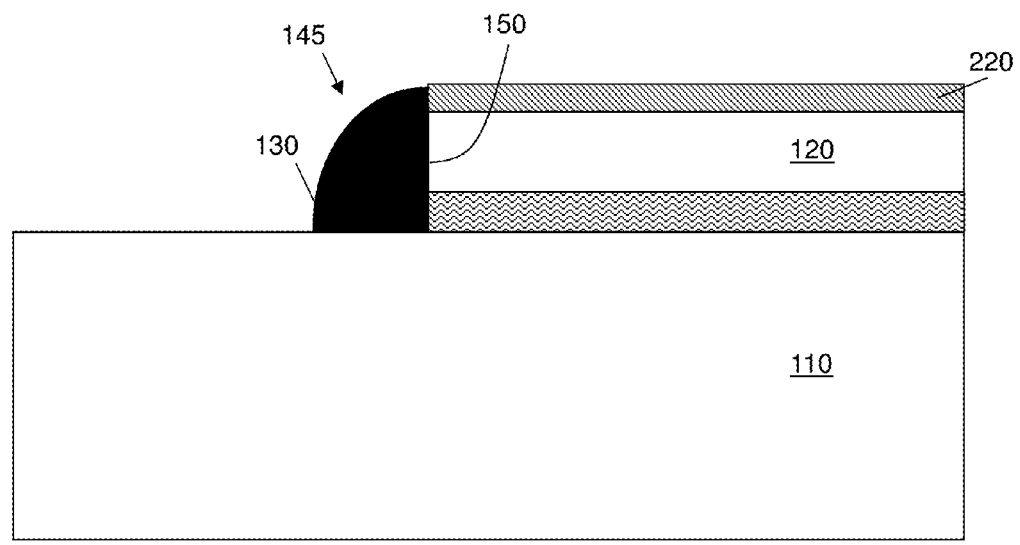
Figure 9E:
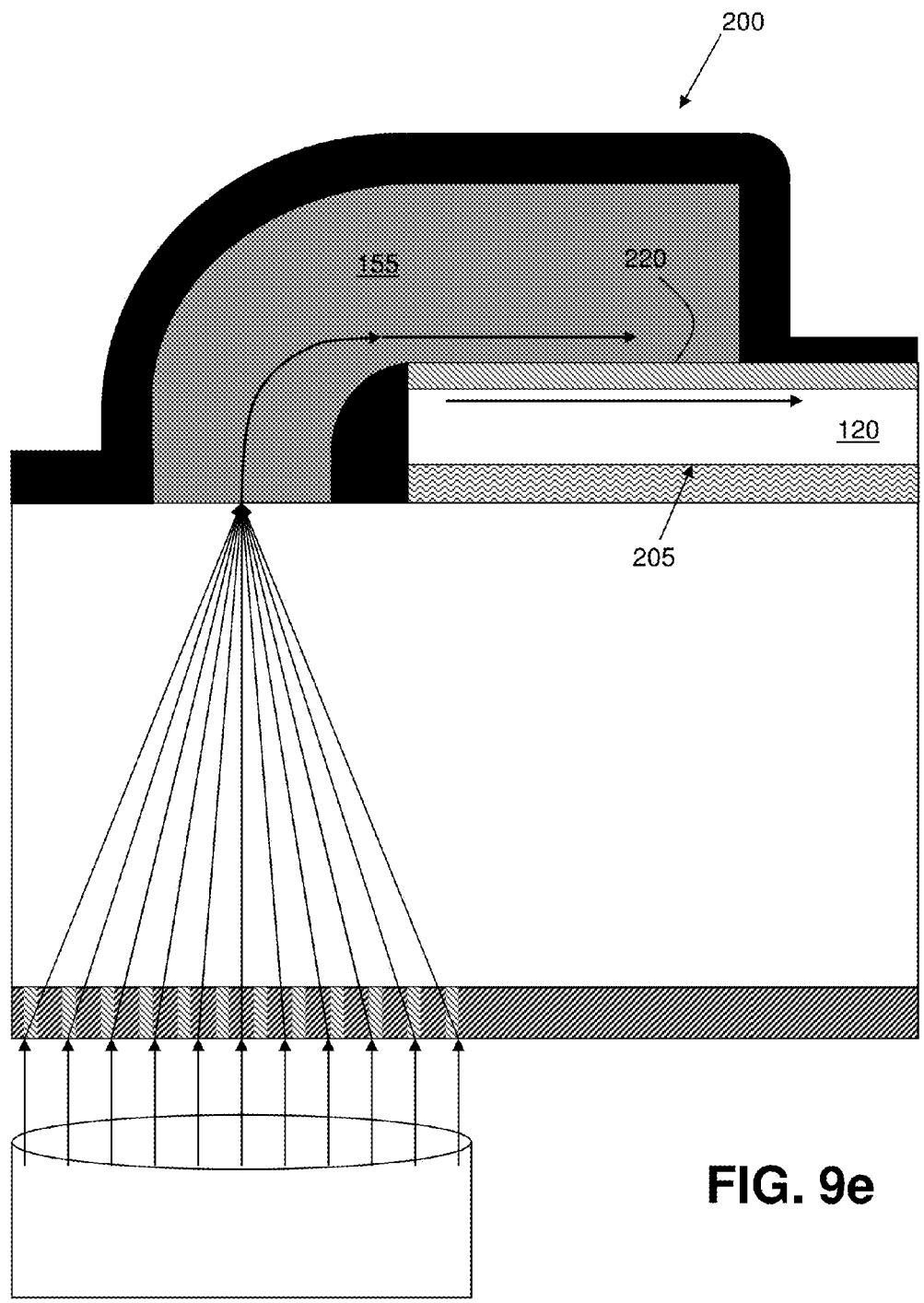

FIGS. 9a-e show an implementation in which a dielectric layer 220 is provided between a portion of the coupler 200 and the waveguide 205. As shown in FIG. 9a, a dielectric layer 220 is formed on the top surface of the semiconductor layer 120 prior to patterning the semiconductor layer 120. Following forming the dielectric layer 220, the structure is processed as shown in FIGS. 9b-9e in a manner similar to the steps described with respect to FIGS. 3-8. In embodiments, the dielectric layer 220 is formed using a material that selectively etches at a slower rate than the oxide layer 130 providing an etch stop for oxide when forming the spacer structure 145 in FIG. 9d. The dielectric layer 220 may be used to aid integration of the structure into frontside processes.

Figure 10:
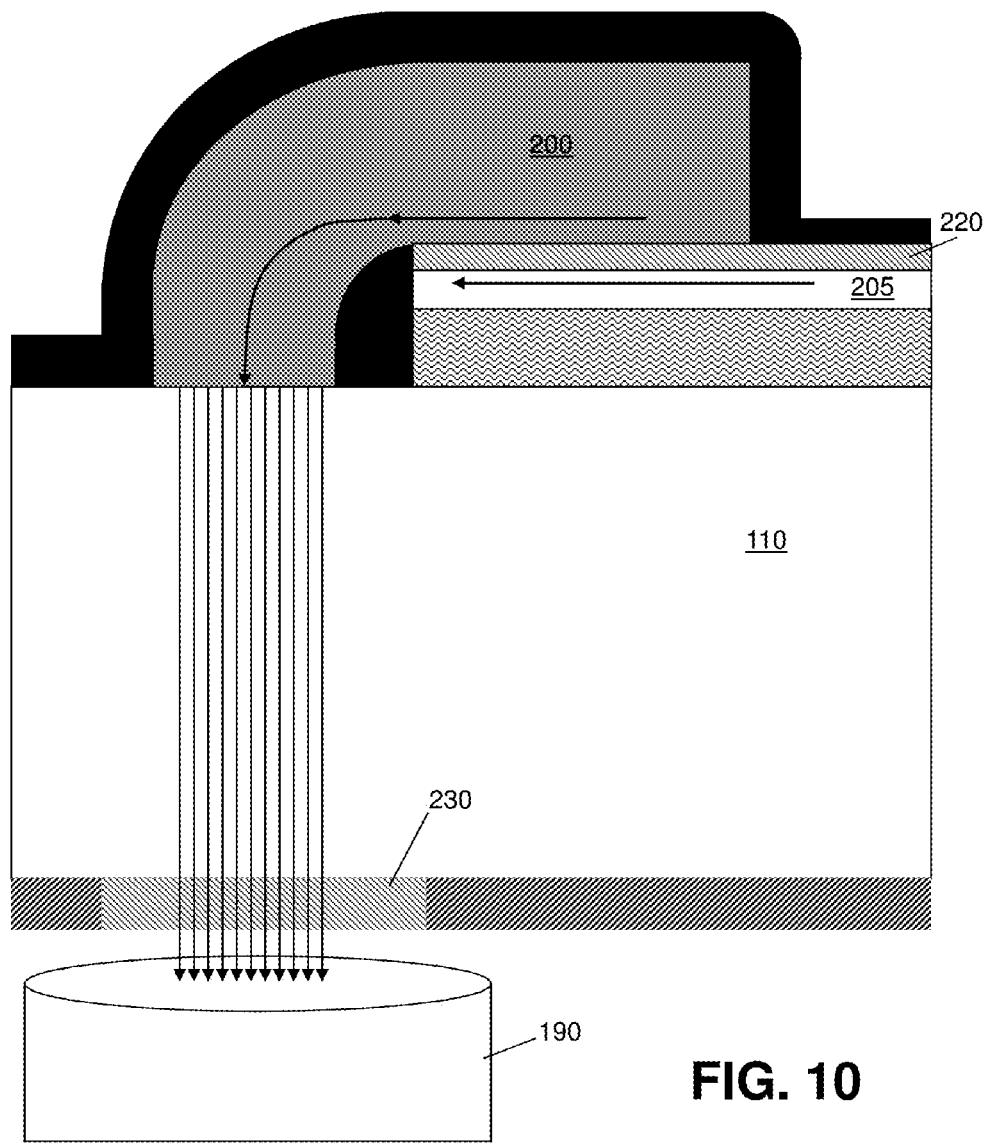

FIG. 10 shows an implementation in which an antireflective coating 230 is provided at the backside of the substrate 110 instead of a lens. In this implementation, the direction of travel of light is reversed from that described herein. Particularly, light travels from the waveguide 205 into the coupler 200, from the coupler 200 into the substrate 110, through the antireflective coating 230 and into the fiber 190. In this manner, light is output through the backside of the substrate 110 into the fiber 190.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of manufacturing a device, comprising:
    forming an optical coupler having a first end contacting a front side of a semiconductor substrate and a second end contacting an optical waveguide on an insulator layer on the substrate; and
    forming a curved spacer on the front side of the substrate and contacting a sidewall of the optical waveguide and a sidewall of the insulator layer, wherein:
    the optical coupler is curved between the first end and the second end, and
    the optical coupler is configured to change a direction of travel of light from a first direction at the first end to a second direction at the second end.

2. The method of claim 1, wherein the forming the optical coupler comprises forming a silicon layer conformally on the curved spacer.

3. The method of claim 2, wherein the forming the optical coupler comprises forming an oxide cladding layer on a curved upper surface of the silicon layer.

4. The method of claim 1, further comprising forming a diffraction grating lens at a back side of the substrate, wherein the lens is aligned with the first end of the optical coupler to focus light on the first end of the optical coupler.

5. The method of claim 1, further comprising forming an anti-reflective coating at a back side of the substrate, wherein the anti-reflective coating is vertically aligned with the first end of the optical coupler.

6. A method of manufacturing a device, comprising:
removing a portion of a semiconductor layer and a portion of a buried insulator layer from a front side of a substrate;
forming a curved spacer on the front side of the substrate and contacting a sidewall of the semiconductor layer and a sidewall of the buried insulator layer;
forming a silicon structure on the substrate, the curved spacer, and the semiconductor layer, wherein the silicon structure includes: a first end contacting the front side of the substrate, a second end contacting the semiconductor layer, and a curved upper surface between the first end and the second end; and
forming a cladding layer on the curved upper surface of the silicon structure.

7. The method of claim 6, wherein the forming the silicon structure comprises:
conformally depositing a silicon layer on upper surfaces of the substrate, the curved spacer, and the semiconductor layer; and
removing portions of the silicon layer from the substrate and the semiconductor layer.

8. The method of claim 6, further comprising coupling an optical fiber to a back side of the substrate.

9. The method of claim 8, further comprising forming a lens at the back side of the substrate, wherein the lens is aligned between the optical fiber and the first end of the silicon structure.

10. The method of claim 9, wherein the lens comprises a diffraction grating lens that is configured to focus light from the optical fiber onto the first end of the silicon structure.

11. The method of claim 8, further comprising forming an anti-reflective coating at the back side of the substrate, wherein the anti-reflective coating is aligned between the optical fiber and the first end of the silicon structure.

12. An integrated device, comprising:
a silicon-material substrate;
an optical waveguide over a front side of the substrate;
an optical coupler comprising a first end contacting the front side of the substrate and a second end contacting the optical waveguide; and
a curved spacer on the front side of the substrate, wherein:
the optical coupler is curved between the first end and the second end,
the optical coupler is configured to change a direction of travel of light from a first direction at the first end to a second direction at the second end, and
a first curved surface of the optical coupler is on the curved spacer.

13. The device of claim 12, further comprising a curved oxide layer on a second curved surface of the optical coupler.

14. The device of claim 13, wherein the curved spacer and the curved oxide layer are cladding layers of the optical coupler.

15. The device of claim 12, further comprising an optical fiber coupled to a back side of the substrate.

16. The device of claim 15, further comprising a lens at the back side of the substrate, wherein the lens is aligned between the optical fiber and the first end of the optical coupler.

17. The device of claim 15, further comprising an anti-reflective coating at the back side of the substrate, wherein the anti-reflective coating is aligned between the optical fiber and the first end of the optical coupler.

18. The device of claim 15, wherein:
the first direction is vertical and parallel to a direction of travel of light in the optical fiber; and
the second direction is horizontal and parallel to a direction of travel of light in the optical waveguide.

* * * * *